3,257,456
2-ADAMANTANONE AND DERIVATIVES
George W. Smith, Wilmington, Del., assignor to E. I. du Pont de Nemours and Company, Wilmington, Del., a corporation of Delaware
No Drawing. Filed May 4, 1964, Ser. No. 364,769
1 Claim. (Cl. 260—586)

This application is a continuation-in-part of my now abandoned application Serial No. 286,456, filed June 10, 1963, which in turn is a continuation-in-part of my application Serial No. 861,202, filed December 22, 1959, now abandoned.

The present invention relates to novel derivatives of adamantane and to methods and compositions for their use.

The new compounds of this invention are 2-adamantanone (2-ketoadamantane) and a class of compounds prepared from 2-adamantanone having the formula:

(1) 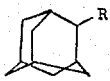

where R is

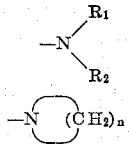

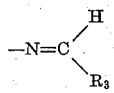

where $n$ is an integer of from 2 through 6;

$$-N=C\diagup^H_{\diagdown R_3}$$

wherein $R_1$ is hydrogen; alkyl of 1 through 6 carbon atoms; mono-substituted alkyl of 1 through 4 carbon atoms where the susbtituent is hydroxy, alkoxy of 1 through 2 carbon atoms, amino, alkylamino of 1 through 4 carbon atoms, dialkylamino where each alkyl is 1 through 4 carbon atoms; alkenyl of 2 through 6 carbon atoms; alkynyl of 2 through 6 carbon atoms; cyclopropyl; cyclopropylmethyl; cyclobutyl; cyclobutylmethyl;

$R_2$ is $R_1$; chlorine; bromine; formyl; —$CH_2COOH$; —$CH_2COOCH_3$; —$CH_2COOC_2H_5$; with the proviso that when $R_1$ is an alkenyl or alkynyl having the unsaturated bond in the 1-position, $R_2$ is alkyl or mono-substituted alkyl as defined above; and $R_3$ is aliphatic; mono-substituted aliphatic where the substituent is aromatic or heterocyclic; aromatic; or heterocyclic containing not more than 12 carbon atoms.

It will be understood that the compounds of Formula 1, having a basic amino group, readily form salts with non-toxic acids and such salts are also included within the scope of the present invention. Representative of such salts are hydrochloride, hydrobromide, sulfate, phosphate, nitrite, acetate, succinate, adipate, propionate, tartrate, citrate, bicarbonate, pamoate, cyclohexylsulfamate and acetylsalicylate.

Of the above-mentioned salts, 2-adamantanamine nitrite (2-aminoadamantane nitrite) has been found to have valuable properties which makes it an industrially useful chemical. It is a white solid, soluble in water and in organic solvents and stable up to a temperature of 144° C. This compound is an effective corrosion inhibitor and is particularly suited to the prevention of corrosion of metal surfaces by water and, at the same time, is easy to apply. Furthermore, it retains its inhibiting effect over a wide temperature range and, therefore, can be used in engine oils, which attain relatively high temperatures.

2-adamantanone is useful in the preparation of the 2-adamantanamine nitrite and the compounds of Formula 1 as is more fully described hereinafter. Furthermore, 2-adamantanone shows herbicidal activity in tests, for example, on cotton and cucumber plants. 2-adamantanamine (2-aminoadamantane) shows fungicidal activity in tests, for example, on apple scab.

Compounds within the scope of Formula 1 show outstanding properties in their ability to deter and inhibit incidence and growth of a variety of harmful viruses. A remarkably wide range of activity has been noted in animal tests. In vivo tests in mice have indicated activity against such virus strains as influenza A (S–15), influenza A–2 (Michigan A/AA) and parainfluenza (Sendai). The above-mentioned salts of these compounds of Formula 1 enhance the usefulness of the relatively insoluble amines in pharmaceutical applications.

A broad range of anti-viral activity is noted for the compounds of Formula 1 where R is

wherein $R_1$ and $R_2$ are both hydrogen or where $R_1$ or $R_2$ is hydrogen and the other is allyl or alkyl of 1 through 4 carbon atoms, especially ethyl or methyl. However, compounds of Formula 1 where R is

where $R_1$ and $R_2$ are methyl, ethyl, or allyl have good activity combined with a nearly complete lack of stimulant activity, making them useful in cases where stimulation must be avoided.

Particularly preferred as anti-viral agents are the hydrochlorides of the following compounds:

2-adamantanamine
N-methyl-2-adamantanamine
N,N-dimethyl-2-adamantanamine
N-ethyl-2-adamantanamine
N-allyl-2-adamantanamine
N-ethyl-N-methyl-2-adamantanamine To prepare the compounds of this invention, adamantane is oxidized by air in the presence of an oxidation catalyst to give a product containing 2-adamantanone. This compound is contacted with hydrogen and ammonia in the presence of a hydrogenation catalyst to yield 2-adamantanamine.

One or both of the hydrogens of the 2-amino group of 2-adamantanamine can be replaced by alkyl. This is most conveniently done by aclyation, for instance with an acyl halide, to give an N-acyl-2-adamantanamine, which is then reduced to the N-alkyl-2-adamantanamine. Liehium aluminum hydride is excellent for this, although catalytic hydrogenation or any one of a number of means of reduction known to the art can be used.

The N-alkyl-2-adamantanamines can be acylated again and reduced to give the N,N-dialkyl-2-adamantanamines. Different alkyl groups can be attached by this means. For instance, reduction of N-acetyl-2-adamantanamine followed by reaction of the product with butyryl chloride, followed by reduction, gives N-butyl-N-ethyl-2-adamantanamine. Of course, if acetyl chloride is used, the product is N,N-diethyl-2-adamantanamine, where the alkyl groups are alike.

Formylation of the amino compound followed by reduction is a practical means of obtaining N-methyl-2-adamantanamine. N-formyl-2-adamantanamine is prepared by refluxing 2-adamantanamine with butyl formate, then reduced to give N-methyl-2-adamantanamine. Repetition of this sequence gives N,N-dimethyl-2-adamantanamine. However, it is easier to prepare the latter compound by the use of formaldehyde and formic acid (Eschweiler-Clarke reaction) on 2-adamantanamine.

The method of acylation and reduction is applicable to making compounds in which the alkyl substituents are substituted. Acylation of N-methyl-2-adamantanamine with 3-methoxypropionyl chloride, followed by reduction, gives N - (3 - methoxypropyl) - N-methyl-2-adamantanamine. Reaction of the amine or monoalkyl amine with a dicarboxylic acid anhydride to give the N-substituted alkanamic acid, followed by reduction, introduces the hydroxyalkyl grouping. For instance, reduction of N-(2-adamantyl)-succinamic acid yields N-(4-hydroxybutyl)-2-adamantanamine.

Some substituted alkyl amine compounds are more easily made by other routes. Hydroxyethyl and di-hydroxyethyl compounds are made by reaction of the amine with ethylene oxide. N-carbalkoxymethylamino compounds are made by alkylation with alkyl chloroacetate and base. Aminoalkyl, alkylaminoalkyl, and dialkyl-aminoalkyl compounds are made by alkylation with appropriate aminoalkyl halides and base, although they can be made by treating the corresponding hydroxyalkyl compound with a thionyl halide to replace the hydroxyl group with a halogen and then replacing the halogen with the amino, alkylamino, or dialkylamino group by reaction with ammonia or a primary or secondary amine.

In some cases, N-alkyl and N,N-dialkyl-2-adamantan-amines are easily made by alkylation with alkylating reagents, such as alkyl halides, without resorting to the method of acylation and reduction. When the reagents are used in molar amounts, the monoalkyl compound is generally formed as the major product, whereas greater amounts of the reagents give the dialkylamino compound. This method is not as selective as the method of acylaaion and reduction, which is why it is less preferred. However, it sometimes becomes the method of choice because it involves fewer steps.

Ethylene chloro- and bromohydrin, and alkoxyalkyl halides can be used to alkylate the amine nitrogen of 2-adamantanamine to give the hydroxyethyl and alkoxyalkyl substitutions. For the reasons just given these reactions are less preferable than the method of acylation and reduction, but may be preferred in certain instances, and they illustrate an alternate route to the N-substituted alkyl-2-adamantanamines.

In preparing N-alkyl, N,N-dialkenyl, N-alkynyl, and N,N-dialkynyl-2-adamantanamines, use of the appropriate alkenyl or alkynyl halide with an acid acceptor such as sodium bicarbonate in a solvent such as ethanol is the preferred method. Mixtures of the mono- and dialkenylated and -alkynylated compounds are produced, but the amount of the undesired component can be minimized by varying the amount of the halide. With equimolar amounts of the amine and the halide the mono-substituted compounds predominate. With an excess of halide, the disubstituted compounds predominate. In any event, the mono and disubstituted compounds are relatively easy to separate, for example by distillation. Of course, if the halide is present in huge excess, some quaternization will occur.

The method of acylation and reduction is quite applicable to preparing N-cyclopropylmethyl and N-cyclobutylmethyl compounds. Acylation of 2-adamantanamine with cyclopropanecarboxylic acid chloride gives N-cyclopropylcarbonyl-2-adamantanamine, which gives N-cyclopropylmethyl-2-adamantanamine on reduction.

To prepare N-cyclopropyl and N-cyclobutyl compounds, 2-adamantanone is reduced to 2-adamantanol with sodium borohydride or by catalytic means. This is converted to 2-(p-toluenesulfonyloxy)adamantane with p-toluenesulfonyl chloride in pyridine, and this compound is then heated in the presence of cyclopropylamine or cyclobutylamine to yield N-cyclopropyl- or N-cyclobutyl-2-adamantanamine by the aminolysis. This method is also applicable to making N-(2-adamantyl) alkyleneimines. Substitution of pyrrolidine for the cyclopropylamine yields N-(2-adamantyl-pyrrolidine.

Reaction of 2-adamantanamine with aldehydes gives the corresponding alkylidene, arylidene or heterocyclicylidene aminoadamantane or the compounds of the invention where R in Formula 1 is

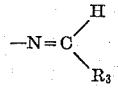

For instance, reaction of 2-adamantanamine with formaldehyde gives 2-adamantyl azomethine, after dehydration. Reaction of 2-adamantanamine with benzaldehyde gives 2-benzylideneaminoadamantane.

Representative of the compounds of this invention are the following compounds and their salts:

2-adamantanamine
N-methyl-2-adamantanamine
N,N-dimethyl-2-adamantanamine
N-methyl-N-ethyl-2-adamantanamine
N,N-diethyl-2-adamantanamine
N-propyl-2-adamantanamine
N-methyl-N-propyl-2-adamantanamine
N-isopropyl-2-adamantanamine
N-methyl-N-isopropyl-2-adamantanamine
N,N-diisopropyl-2-adamantanamine
N-sec-butyl-2-adamantanamine
N-isobutyl-2-adamantanamine
N-tert-butyl-2-admantanamine
N-hexyl-2-adamantanamine
N-isoamyl-2-adamantanamine
N-(1-methylpentyl)-2-adamantanamine
N-(1,1-dimethylbutyl)-2-adamantanamine
N,N-dihexyl-2-adamantanamine
N,N-diisohexyl-2-adamantanamine
N-cyclopropyl-2-adamantanamine
N,N-dicyclopropyl-2-adamantanamine
N-cyclobutyl-2-adamantanamine
N,N-dicyclobutyl-2-adamantanamine
N-cyclopropylmethyl-2-adamantanamine
N-cyclopropylmethyl-N-methyl-2-adamantanamine
N-cyclobutylmethyl-2-adamantanamine
N-methyl-N-vinyl-2-adamantanamine
N-allyl-2-adamantanamine
N-allyl-N-methyl-2-adamantanamine
N,N-diallyl-2-adamantanamine
N-(hexen-3-yl)-2-adamantanamine
N-ethynyl-N-methyl-2-adamantanamine
N-propargyl-2-adamantanamine
N,N-dipropargyl-2-adamantanamine
N-methoxymethyl-2-adamantanamine
N-ethoxymethyl-2-adamantanamine
N-(2-methoxyethyl)-2-adamantanamine
N-(2-ethoxyethyl)-2-adamantanamine
N-(2-methoxyethyl)-N-methyl-2-adamantanamine
N-(4-ethoxybutyl)-N-ethyl-2-adamantanamine
N-hydroxymethyl-2-adamantanamine
N-(2-hydroxyethyl)-2-adamantanamine
N-(2-hydroxyethyl)-N-methyl-2-adamantanamine
N,N-di-(2-hydroxyethyl)-2-adamantanamine
N-(aminomethyl)-2-adamantanamine
N-(aminomethyl)-N-methyl-2-adamantanamine
N-(2-aminomethyl)-2-adamantanamine
N-(methylaminomethyl)-2-adamantanamine
N-(methylaminomethyl)-N-methyl-2-adamantanamine
N-(2-methylaminoethyl)-2-adamantanamine
N-(dimethylaminomethyl)-2-adamantanamine
N-(dimethylaminomethyl)-N-methyl-2-adamantanamine
N-(3-dimethylaminopropyl)-2-adamantanamine
N-(2-diethylaminoethyl)-N-methyl-2-adamantanamine
N-(4-dibutylaminobutyl)-N-hexyl-2-adamantanamine
N,N-di-(2-diethylaminoethyl)-2-adamantanamine
N-chloro-2-adamantanamine
N-bromo-2-adamantanamine N-bromo-N-methyl-2-adamantanamine
N-formyl-2-adamantanamine
N-formyl-N-methyl-2-adamantanamine
N-formyl-N-hexyl-2-adamantanamine
N-(2-adamantyl)glycine
N-(2-adamantyl)sarcosine
N-(2-adamantyl)glycine methyl ester
N-(2-adamantyl)glycine ethyl ester
N-(2-adamantyl)aziridine
N-(2-adamantyl)pyrrolidine
N-(2-adamantyl)piperidine
N-(2-adamantyl)hexamethyleneimine
2-adamantyl azomethine
2-benzylideneaminoadamantane
2-ethylideneaminoadamantane
2-isohexylideneaminoadamantane
2-naphthylideneaminoadamantane
2-furfurylideneaminoadamantane This invention will be better understood by reference to the following illustrative examples, which are given in addition to those above. The parts in the examples are parts by weight.

EXAMPLE 1

2-adamantanone

A mixture of 60 parts of adamantane, 132 parts of benzene, 158 parts of glacial acetic acid, 1 part of benzoyl peroxide, and 0.7 part of cobalt acetate tetrahydrate was charged to a stainless steel autoclave which was pressurized with air to 800 p.s.i. ga. The mixture was heated to 145° C. and air was passed into the mixture for 3 hours at a rate of 0.1 standard cubic foot per minute. The reaction mixture then was cooled to room temperature and diluted with about 2000 parts of water. The benzene layer was separated, and the aqueous portion was extracted twice with 140 parts of ethyl ether each time. The combined ether and benzene solutions were extracted with 100 parts of water, three 100-part portions of 5% sodium bicarbonate, and two 100-part portions of water, and dried over anhydrous magnesium sulfate. The dried ether-benzene solution was concentrated on a steam bath to yield 33.5 parts of light-brown solid, the infrared spectrum of which showed the presence of a carbonyl group and an hydroxyl group, i.e., the presence of 2-adamantanone and 1-adamantanol. The 2-adamantanone was identified further by the preparation of the 2,4-dinitrophenylhydrazone derivative and the oxime. The 2,4-dinitrophenylhydrazone consisted of golden yellow silky needles melting at 213.5–214.5° C. and having the following elemental analysis.

Calcd. for $C_{16}H_{18}N_4O_4$: C, 58.17; H, 5.49; N, 16.96. Found: C, 57.74, 57.95; H, 5.44, 5.47; N, 16.17, 16.19.

The elemental content of the compound therefore agreed closely with that calculated for 2-adamantanone, 2,4-dinitrophenylhydrazone.

The oxime consisted of colorless needles melting at 162.8–163.6° C., and having the following elemental analysis.

Calcd. for $C_{10}H_{15}NO$: C, 72.69; H, 9.15; N, 8.48. Found: C, 72.74; H, 9.11; N, 9.13.

EXAMPLE 2

2-adamantanamine hydrochloride

Twenty-eight parts of the product obtained by the oxidation of adamantane according to the procedure described in Example 1 and consisting essentially of 2-adamantanone and 1-adamantanol, 163 parts of 95% ethanol which was saturated with ammonia, and 5 parts of a 10% palladium-on-alumina catalyst were charged to a reactor and heated to 50–55° C. Hydrogen was passed into the mixture at an initial pressure of 50 p.s.i. ga. After the absorption of hydrogen ceased (4 hours), the catalyst was filtered off, and the filtrate was concentrated to a tan-white solid under reduced pressure. The solid was mixed with 52.5 parts of 10% hydrochloric acid and 25 parts of water, and then extracted with 212 parts of ethyl ether. The ether solution was washed with 150 parts of 5% sodium bicarbonate and 100 parts of water and dried over anhydrous magnesium sulfate. 1-adamantanol was isolated from the ether solution. The aqueous hydrochloric acid solution was made basic by the addition of 66.5 parts of 10% sodium hydroxide and then was extracted with ether. The ether solution was dried over anhydrous magnesium sulfate and concentrated. Sublimation of the residue at 70° C. afforded 1.43 parts of a white solid having a characteristic amine odor. Vapor chromatography of the product showed the presence of only one component. The product was dissolved in ether, and hydrogen chloride was passed into the solution. After recrystallization from isopropyl alcohol, colorless crystals were obtained which melted at 300–325° C. (with gradual decomposition). The elemental analysis was:

Calcd. for $C_{10}H_{18}NCl$: C, 63.99; H, 9.67; N, 7.46. Found: C, 64.35; H, 9.59; N, 7.43.

The elemental content of the compound therefore agreed closely with that calculated for $C_{10}H_{18}NCl$, the empirical formula of 2-adamantanamine hydrochloride. Thus the compound of characteristic amine odor was shown to be 2-adamantanamine.

EXAMPLE 3

2-adamantanamine nitrite

A solution of 1.3 parts of 2-adamantanamine in 45 parts of water containing 5% hydrochloric acid sufficient to give a pH of 8 was treated with freshly precipitated silver nitrite (prepared from 1.53 parts of silver nitrate in 12 parts of water and 0.64 parts of sodium nitrite in 12 parts of water), and the mixture was stirred at room temperature in the absence of light for 3.5 hours under a nitrogen atmosphere. The mixture then was filtered to remove silver salts, and the colorless filtrate was concentrated to a solid residue under vacuum. The residue was mixed with absolute ethanol and distilled to remove traces of water. After drying, 1.23 parts of a white solid was obtained which melted with decomposition at 135.2–136.6° C. Recrystallization of this solid from a mixture of isopropyl alcohol and acetone gave white crystals melting at 144.5° C. with decomposition. The infrared spectrum of the product had the characteristic $NH_3^+$ and $ONO^-$ bands, thus confirming the structure of the compound as that of 2-adamantanamine nitrite. The same compound is obtained when 2-adamantanamine is treated with sodium nitrite in a dimethyl sulfoxide solution containing hydrochloric acid.

As may be seen from the foregoing examples, the present invention provides a convenient process for producing 2-adamantanamine nitrite, which is useful as a corrosion inhibitor. The intermediate products made by this process are 2-adamantanone and 2-adamantanamine.

The oxidation of adamantane is effected by means of an oxygen-containing gas such as air and in the presence of an oxidation catalyst, for example, a heavy-metal salt of a carboxylic acid, such as cobalt acetate. While the exact oxidation conditions used may vary, I prefer to operate at a temperature within the range of 100° C. to 160° C. and at a pressure within the range of 500 to 1000 p.s.i. ga. I have found that the oxidized product contains 2-adamantanone and 1-adamantanol and that the hydroxy compound need not be separated from the product prior to the reductive amination step. Therefore, the oxidized product can be used directly for the production of 2-adamantanone. I prefer to carry out the reductive amination of 2-adamantanone by passing hydrogen into a solution of oxidized adamantane, for example an ethanol solution, saturated with ammonia which contains a hydrogenation catalyst, for example palladium-on-carbon or palladium-on-alumina. While the temperature and pressure used may vary, I have found that temperatures of 20–100° C. and pressures of 20–100 p.s.i. ga.

are very effective. If desired, the 1-adamantanol formed in the oxidation step can be removed from the reductive amination product by acidifying and extracing with ether.

The 2-adamantanamine is converted to the amine nitrite by treatment with an inorganic nitrite, such as silver nitrite or sodium nitrite, in the presence of hydrochloric acid. This reaction occurs readily at room temperature and atmospheric pressure, although higher temperatures and pressures may be used in order to reduce the reaction time. Temperatures up to the decomposition temperature of the nitrite may be used.

EXAMPLE 4

*N-methyl-2-adamantanamine hydrochloride*

A mixture of 1.88 g. of 2-adamantanamine hydrochloride, 2.0 g. of ethyl chloroformate and 40 ml. of benzene was refluxed for 5 hours. It was cooled to 5° C. and 3 g. of triethylamine was added slowly. The mixture was again refluxed for 5 hours, and then cooled to 5° C. The solids were filtered, and the filtrate was washed with dilute hydrochloric acid, dried with anhydrous magnesium sulfate, and vacuum concentrated. The oily residue crystallized on addition of petroleum ether. This compound, ethyl adamant-2-ylurethane, was filtered and dried. The yield was 1.9 g., M.P. 84–85° C.

A solution of 1.9 g. of ethyl adamant-2-ylurethane in 25 ml. of dry tetrahydrofuran was added slowly to a mixture of 0.8 g. of lithium aluminum hydride in 10 ml. of anhydrous ether. The mixture was refluxed overnight with good stirring, then was cooled to 5° C. and water was added dropwise until the gray color of the unreacted lithium aluminum hydride just disappeared. Then, 20 ml. of ether was added, and the mixture was filtered. The filtrate was concentrated in a vacuum and the residue was dissolved in 30 ml. of ether. This solution was dried with anhydrous magnesium sulfate; then it was gassed with anhydrous hydrogen chloride until it became just acidic. The solids which precipitated were filtered and recrystallized from methanol-ether to give 1.4 g. of N-methyl-2-adamantanamine hydrochloride, M.P. 370° C. (d.).

*Analysis.*—Calcd. for $C_{11}H_{20}ClN$: C, 65.48; H, 9.99; Cl, 17.58; N, 6.94. Found: C, 65.96; H, 9.96; Cl, 17.37; N, 6.86.

EXAMPLE 5

*N-ethyl-2-adamantanamine hydrochloride*

250-ml. flask with reflux condenser, drying tube and stirrer is charged with 0.10 mole of N-acetyl-2-adamantanamine (prepared by acetylation of 2-adamantanamine with acetic anhydride containing a drop of sulfuric acid), 100 ml. of diethylene gylcol dimethyl ether, and 5.7 g. (0.15 mole) of lithium aluminum hydride. The mixture is heated in an oil bath at 60° C. for 8 hours, and finally at 120° C. for 2 hours. After cooling, it is cautiously treated with water to decompose the excess lithium aluminum hydride. The insoluble aluminum compounds are dissolved by adding a 20% solution of sodium potassium tartrate. The mixture is extracted with ether, the ether is dried with potassium hydroxide pellets, and it is vacuum concentrated. The residue is suspended in 50 ml. of water, taken to pH 2 with concentrated hydrochloric acid, and the resulting solution is extracted with ether to remove any traces of unreacted starting material. The raffinate is vacuum concentrated to yield a residue consisting of N-ethyl-2-adamantanamine hydrochloride.

EXAMPLE 6

*N-hexyl-2-adamantanamine hydrochloride*

Molar equivalents of 2-adamantanamine and caproyl chloride are reacted in pyridine to give N-caproyl-2-adamantanamine, which is isolated by pouring the reaction mixture into water and removing the amide by filtration. After careful drying of the product, a tetrahydrofuran solution is slowly added to a suspension of one molar equivalent (25% excess) of lithium aluminum hydride in diethyl ether. After addition, the reaction is refluxed overnight, then cooled to 5° C. Water is cautiously added, dropwise, until the gray color of the lithium aluminum hydride just disappears. The mixture is filtered, the filtrate is vacuum concentrated, and the residue is dissolved in a small amount of diethyl ether. This solution is gassed with anhydrous hydrogen chloride until it is just acidic. The precipitate of N-hexyl-2-adamantanamine hydrochloride is collected by filtration.

EXAMPLE 7

*N-(3-methoxypropyl)-2-adamantanamine hydrochloride*

Example 6 is repeated, substituting an equivalent amount of 3-methoxypropionyl chloride for the caproyl chloride, to obtain N-(3-methoxypropionyl)-2-adamantanamine, which is then reduced with lithium aluminum hydride to N-(3-methoxypropyl) - 2 - adamantanamine which is isolated as the hydrochloride salt by the procedure of that example.

EXAMPLE 8

*N,N-dimethyl-2-adamantanamine hydrochloride*

A mixture of 0.7 g. of 2-adamantanamine hydrochloride, 20 ml. of 98% formic acid and 0.2 g. of sodium formate was warmed to 80° C., and, with stirring, 2.5 g. of 37% formaldehyde was added. The mixture was refluxed (95° C.) for 1.5 hours, then cooled to room temperature and vacuum concentrated to a small volume. Then, 7 ml. of 25% sodium hydroxide was added, and the mixture was extracted twice with 25-ml. portions of diethyl ether. The ether extracts were combined, dried with anhydrous magnesium sulfate, and filtered. The filtrate was gassed with anhydrous hydrogen chloride until it was just acidic. The precipitate was filtered and recrystallized from methanol-ether to give 0.2 g. of N,N-dimethyl-2-adamantanamine hydrochloride, M.P. 303.5–304.0° C.

EXAMPLE 9

*N-ethyl-N-methyl-2-adamantanamine hydrochloride*

N-methyl-2-adamantanamine (Example 4) is converted to the acetyl derivative by gently warming it in an excess of acetic anhydride containing a drop of sulfuric acid. The resulting solution is poured on ice, and extracted with chloroform. The chloroform extract is dried with anhyrous magnesium sulfate and vacuum concentrated to yield a residue of N-acetyl-N-methyl-2-adamantanamine. A solution of this amide in tetrahydrofuran is added slowly to a suspension of one molar equivalent of lithium aluminum hydride in diethyl ether. After addition, the reaction mixture is refluxed for 4 hours, cooled, and the excess lithium aluminum hydride is decomposed by cautiously adding water. The amine is isolated by steam distillation. The ether layer of the steam distillate is separated and dried with potassium hydroxide pellets. It is then gassed with anhydrous hydrogen chloride until it is just acidic, and vacuum concentrated to yield a residue of N-ethyl-N-methyl-2-adamantanamine hydrochloride.

EXAMPLE 10

*N-(2-adamantyl)pyrrolidine hydrochloride*

A solution of 0.1 mole of 2-adamantanamine in 50 ml. of benzene is added slowly to a solution of 0.1 mole of succinic anhydride in 100 ml. of benzene. The mixture is heated at reflux for 1 hour, then the benzene is removed by distillation. An excess of acetyl chloride (0.15 mole) is added to the residue and the mixture is heated at reflux on the steam bath for 1 hour. The excess acetyl chloride is distilled at atmospheric pressure and the acetic acid formed by dehydration of the initially formed succinamic acid is removed at 100° C. and 15 mm. pressure. The residue is N-(2-adamantyl)succinimide. This is dried in a vacuum desiccator over sodium hydroxide pellets and then dissolved in dry tetrahydrofuran and added slowly to a suspension of 0.15 mole of lithium aluminum hydride in diethyl ether. The mixture is refluxed for 12 hours, cooled, and water is cautiously added to destroy the excess lithium aluminum hydride. The mixture is extracted with diethyl ether, which is dried with potassium hydroxide pellets and then gassed with anhydrous hydrogen chloride until it is just acidic. This is vacuum concentrated to yield a residue of N-(2-adamantyl)pyrrolidine hydrochloride.

EXAMPLE 11

*N-allyl-2-adamantanamine*
*N,N-diallyl-2-adamantanamine*

A 2-liter 4-necked round-bottom flask is equipped with thermometer, dropping funnel, reflux condenser, paddle stirrer and a connection to a gas meter, and charged with 500 ml. of absolute ethanol, 50.4 g. (0.60 mole) of sodium bicarbonate and 37.5 g. (0.20 mole) of 2-adamantanamine hydrochloride. Then, 24.2 g. (0.20 mole) of allyl bromide is added from the dropping funnel. There is no appreciable evolution of carbon dioxide. The mixture is gradually warmed to 65° C., whereupon gas evolution begins. The reaction is allowed to proceed until no more gas is evolved (about 1.5 liters). The mixture is cooled, the solids are filtered, and the filtrate is evaporated. The residue is distributed between ether and 10% sodium hydroxide solution. The ether layer is dried with anhydrous potassium carbonate and evaporated to give an oil. This is distilled at reduced pressure to give two main fractions. The lower-boiling fraction is N-allyl-2-adamantanamine. The higher is N,N-diallyl-2-adamantanamine.

EXAMPLE 12

*N-propargyl-2-adamantanamine*
*N,N-dipropargyl-2-adamantanamine*

A reaction is run as described in Example 11 using 37.5 g. (0.20 mole) of 2-adamantanamine hydrochloride, 16.4 g. (0.20 mole) of propargyl chloride, 50.4 g. (0.60 mole) of sodium bicarbonate and 500 ml. of absolute ethanol. The cooled mixture is filtered and the filtrate is evaporated. The residue is distributed between 10% sodium hydroxide and ether. The ether layer is dried with anhyrous potassium carbonate and evaporated. The residue is distilled at reduced pressure to yield two main fractions. The lower-boiling fraction is N-propargyl-2-adamantanamine and the higher is N,N-dipropargyl-2-adamantanamine.

EXAMPLE 13

*N-(2-diethylaminoethyl)-2-adamantanamine*

Equimolar amounts of freshly prepared 2-diethylaminoethyl chloride and 2-adamantanamine and a 10% excess of sodium bicarbonate are refluxed in methyl alcohol for 16 hours. The reaction mixture is cooled, poured into water, and extracted with ether. The ether extract is dried with solid sodium hydroxide and vacuum concentrated. The residue is distilled at reduced pressure to give N-(2-diethylaminoethyl)-2-adamantanamine.

EXAMPLE 14

*N-hydroxymethyl-2-adamantanamine*

A suitable flask equipped with stirrer, thermometer, reflux condenser, dropping funnel and cooling bath is charged with 2.0 moles of 2-adamantanamine. A 37% aqueous solution of formaldehyde (2.05 moles) is added slowly with stirring, maintaining the temperature below 40° C. After addition in complete, the reaction is cooled to room temperature, and powdered potassium hydroxide (10 g.) is added to aid in separation of the water. The organic layer is separated and dried over potassium hydroxide to yield N-hydroxymethyl-2-adamantanamine.

EXAMPLE 15

*N-hydroxymethyl-N-methyl-2-adamantanamine*

Example 14 is repeated using 2.0 moles of N-methyl-2-adamantanamine in place of the 2.0 moles of 2-adamantanamine. The product is N-hydroxymethyl-N-methyl-2-adamantanamine.

EXAMPLE 16

*N-(diethylaminomethyl)-N-methyl-2-adamantanamine*

A 0.1 mole amount of N-hydroxymethyl-N-methyl-2-adamantanamine (Example 15) is refluxed at 55° C. in a mixture of 100 ml. of anhydrous diethylamine and 10 g. of potassium hydroxide pellets for 4 hours. The mixture is cooled, and the liquid in decanted from the residual pellets and the small layer of concentrated potassium hydroxide solution. It is distilled at reduced pressure to yield N-(diethylaminomethyl)-N-methyl-2-adamantanamine.

EXAMPLE 17

*N-(2-hydroxyethyl)-2-adamantanamine*
*N,N-di-(2-hydroxyethyl)-2-adamantanamine*

A solution of 0.5 mole of 2-adamantanamine in 120 ml. of tetrahydrofuran and 30 ml. of water is charged to a 400-ml. stainless steel autoclave, and 5.0 g. (0.11 mole) of ethylene oxide is injected. The autoclave is heated at 70° C. for 24 hours, then cooled and cautiously vented. Solvent is removed from the reaction mixture at reduced pressure, and the residue is extracted with ether. The ether extract is dried with anhydrous potassium carbonate, then vacuum concentrated, and the residue is subjected to sublimation at 100° C. and 20 mm. in order to remove unreacted 2-adamantanamine. The residue from the sublimation is distilled at reduced pressure to yield N-(2-hydroxyethyl)-2-adamantanamine as the lower-boiling fraction. Continuation of the distillation gives N,N-di-(2-hydroxyethyl)-2-adamantanamine as the higher-boiling fraction.

EXAMPLE 18

*N-(2-adamantyl)glycine ethyl ester*

A 100-ml. flask with stirrer and reflux condenser is charged with 0.1 mole of 2-adamantanamine, 0.1 mole of ethyl chloroacetate, 0.11 mole of sodium bicarbonate, and 40 ml. of methanol. The mixture is refluxed overnight, the insoluble material is filtered, and the filtrate is evaporated to dryness. The residue is dissolved in 1 normal hydrochloric acid, regenerated by adding 5% sodium hydroxide, and extracted with ether. The ether extract is dried with anhydrous sodium sulfate and vacuum concentrated. The residue is distilled at reduced pressure to obtain a lower-boiling fraction which is recovered starting material and a higher-boiling fraction which is N-(2-adamantyl)glycine ethyl ester.

EXAMPLE 19

*N-formyl-2-adamantanamine*

An 0.05 mole amount of 2-adamantanamine is refluxed 19 hours in 25 ml. of butyl formate. The excess butyl formate is removed by vacuum concentration, and the residue is recrystallized to yield N-formyl-2-admantanamine.

EXAMPLE 20

*2-adamantyl azomethine*

The organic layer of N-hydroxymethyl-2-adamantanamine obtained in Example 14 is distilled at reduced pressure to yield 2-adamantyl azomethine.

EXAMPLE 21

*2-benzaldiminoadamantane*

A flask equipped with a Dean-Stark water separator is charged with 0.1 mole of 2-adamantanamine and 0.1 mole of freshly distilled benzaldehyde in 50 ml. of toluene. The mixture is refluxed for 45 hours, then cooled. The toluene is removed by vacuum concentration and the residue is recrystallized to yield 2-benzaldiminoadamantane.

EXAMPLE 22

*N-chloro-2-adamantanamine*

A suspension of 0.1 mole of 2-adamantanamine in 100 ml. of ice water is placed in a 500-ml. flask equipped with a mechanical stirrer and a thermometer. The flask is cooled in an ice bath, and 142 g. of 5.25% sodium hypochlorite solution (commercial "Clorox") is added at such a rate that the temperature does not exceed 10° C. After the addition the ice bath is removed and the mixture is stirred for 30 minutes. It is then extracted with three 50-ml. portions of ether, which are combined and dried over calcium chloride. This solution is vacuum concentrated to yield N-chloro-2-adamantanamine.

EXAMPLE 23

*2-adamantanamine hydrochloride*

A solution of 0.10 mole of 2-adamantanamine and 9.87 g. (0.10 mole) of 38% hydrochloric acid in 100 ml. of water is concentrated in a vacuum at 60° C. The resulting salt, 2-adamantanamine hydrochloride, is dried in a vacuum at 60° C.

EXAMPLE 24

*N-methyl-2-adamantanamine acetate*

A solution of 0.10 mole of 2-adamantanamine and 6.0 g. (0.10 mole) of glacial acetic acid in 100 ml. of water is concentrated in a vacuum at 60° C. The resulting salt, 2-adamantanamine hydrochloride, is dried in a vacuum at 60° C.

EXAMPLE 25

*N-ethyl-2-adamantanamine bitartrate*

A mixture of 0.10 mole of N-ethyl-2-adamantanamine, 0.10 mole of tartaric acid and 100 ml. of ether is vacuum concentrated at 60° C., and the residue is dried to yield N-ethyl-2-adamantanamine bitartrate.

EXAMPLE 26

*N-hexyl-2-adamantanamine pamoate*

A solution of 0.20 mole of N-hexyl-2-adamantanamine hydrochloride in 250 ml. of water is added at a solution of 0.10 mole of pamoic acid, disodium salt in 500 ml. of water. The resulting precipitate is filtered, washed well with water, and dried to give N-hexyl-2-adamantanamine pamoate.

EXAMPLE 27

*2-adamantanamine cyclohexylsulfamate*

A solution of 0.10 mole of 2-adamantanamine in 100 ml. of absolute ethanol is added to a solution of 0.10 mole of cyclohexylsulfamic acid in 100 ml. of absolute ethanol. The mixture is vacuum concentrated to yield 2-adamantanamine cyclohexylsulfamate.

EXAMPLE 28

*N,N-dimethyl-2-adamantanamine sulfate*

A solution of 0.10 mole of N,N-dimethyl-2-adamantanamine hydrochloride in 100 ml. of water is treated with 4.9 g. (0.05 mole) of concentrated sulfuric acid. The resulting precipitate is filtered and dried to yield N,N-dimethyl-2-adamantanamine sulfate.

EXAMPLE 29

*2-adamantanamine bicarbonate*

Carbon dioxide is passed into a solution of 0.10 mole of 2-adamantanamine in 100 ml. of diethyl ether until precipitation is complete. The precipitate is filtered and vacuum dried to give 2-adamantanamine bicarbonate.

The preceding examples can be repeated substituting equivalent amounts of appropriate starting materials to obtain other compounds of this invention including those listed hereinbefore.

The compounds of Formula 1 and their non-toxic salts can be administered in the antiviral treatment according to this invention by any means that effects contact of the active ingredient compound with the site of virus infection in the body. It will be understood that this includes the site prior to infection setting in as well as after. For example, administration can be parenterally, that is subcutaneously, intravenously, intramuscularly, or intraperitioneally. Alternatively or concurrently, administration can be by the oral route.

The dosage administered will be dependent upon the virus being treated, the age, health and weight of the recipient, the extent of infection, kind of concurrent treatment, if any, frequency of treatment, and the nature of the effect desired. Generally, a daily dosage of active ingredient compound will be from about 1 to 50 milligrams per kilogram of body weight, although lower, such as 0.5 milligram per kilogram of body weight can be used. Ordinarily, from 1 to 20 and preferably 1 to 10 milligrams per kilogram per day, in one or more applications per day, is effective to obtain the desired result.

The active ingredient of this invention can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use (except intravenous). In such compositions the active ingredient will ordinarily always be present in an amount of at least 0.5% by weight based on the total weight of the composition and not more than 90% by weight.

Besides the active ingredient of this invention the antiviral composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 30–60% by weight of a compound of Formula 1 or 2 and 70–40% of a carrier. In another embodiment, the active ingredient is tableted with or without adjuvants. In yet another embodiment, the active ingredient is put into powder packets and employed. These capsules, tablets and powders will generally constitute from about 5% to about 95% and preferably from 25% to 90% by weight. These dosage forms preferably contain from about 5 to about 500 milligrams of active ingredient, with from about 25 to about 250 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectible solutions. Sterile injectible solutions such as saline will ordinarily contain from about 0.5% to 25%, and preferably about 1 to 10% by weight of the active ingredient.

As mentioned above, oral administration can be in a suitable suspension or syrup, in which the active ingredient ordinarily will constitute from about 0.5 to 10%, and preferably about 2 to 5%, by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, a well known reference text in this field.

In addition to the exemplary illustrations above, the following examples further explain the present invention:

EXAMPLE 30

A large number of unit capsules are prepared by filling standard two-piece hard gelatin capsules weighing about 50 milligrams each with 50 milligrams of powdered 2-adamantanamine, hydrochloride, 125 milligrams of lactose and 1 milligram of "Cab-o-sil."

EXAMPLE 31

Example 30 is repeated except that soft gelatin capsules are used and the powdered 2-adamantanamine is first dissolved in mineral oil.

EXAMPLE 32

Example 30 is repeated except that the dosage unit is 50 milligrams of active ingredient, 5 milligrams of gelatin, 1.5 milligrams of magnesium stearate and 100 milligrams of lactose, mixed and formed into a tablet by a conventional tableting machine. Slow release pills or tablets can also be used, by applying appropriate coatings. A sugar coating can be applied to increase palatability.

EXAMPLE 33

A parenteral composition suitable for administration by injection is prepared by stirring 5% by weight of the active ingredient of Example 30 in sterile aqueous 0.9% saline.

A large variety of compositions according to this invention can thus readily be made by substituting other compounds of Formula 1 of this invention, and including specifically but not limited to compounds of Formula 1 that have specifically been named hereinbefore. The compounds will be used in the amounts indicated in accordance with procedures well known and described in the Martin and Cook text mentioned above.

Compounds within the scope of Formula 1 of the invention are anti-viral agents in domestic animals and livestock. As an illustration, compounds within the scope of Formula 1 are effective against swine influenza and an embodiment of the invention, therefore, is the control of this infection by incorporating an active ingredient compound in the diet of the affected animal. For most purposes, an amount of active compound will be used to provide from about 0.0001% to 0.1% by weight of the active compound based on the total weight of feed intake. Preferably, from 0.001% to 0.02% by weight will be used.

In like manner novel and useful compositions are provided by this invention which comprise at least one active ingredient compound within the scope of this invention in admixture with an animal feed. Descriptions of suitable feeds can be found in the book "Feeds and Feeding" by Frank B. Morrison, published by the Morrison Publishing Company of Ithaca, New York, 1948, 21st edition. The selection of the particular feed is within the knowledge of the art and will depend of course on the animal, the economics, natural materials available, the surrounding circumstances and the nature of the effect desired, as will be readily understood.

A particularly important composition according to this feature of the invention is a concentrate, suitable for preparation and sale to a farmer or livestock grower for addition to the animal's feedstuffs in appropriate proportion. These concentrates ordinarily comprise about 0.5% to about 95% by weight of the active ingredient compound together with a finely divided solid, preferably flours, such as wheat, corn, soya bean and cottonseed. Depending on the recipient animal, the solid adjuvant can be ground cereal, charcoal, fuller's earth, oyster shell and the like. Finely divided attapulgite and bentonite can be used, these latter materials also acting as solid dispersing agents.

The feed compositions, as well as the just-described concentrates, can additionally contain other components of feed concentrates or animal feeds, as will be readily understood. Other particularly important additives include proteins, carbohydrates, fats, vitamins, minerals, antibiotics, etc.

The disclosure herein should not be taken as a recommendation to use the disclosed invention in any way without full compliance with U.S. Food and Drug laws and other laws and governmental regulations which may be applicable.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecessary limitations are to be understood therefrom.

I claim:
2-adamantanone.

References Cited by the Examiner

UNITED STATES PATENTS

| | | | |
|---|---|---|---|
| 2,393,607 | 1/1946 | Bruson | 260—586 |
| 2,426,276 | 8/1947 | Meiser | 167—65 |
| 2,500,385 | 3/1950 | Schmerling | 260—586 |
| 2,770,571 | 11/1956 | Vance et al. | 167—83 |
| 2,831,027 | 4/1958 | Pfister et al. | 260—563 |
| 2,899,361 | 8/1959 | McMillion | 167—83 |
| 2,972,631 | 2/1961 | Bain et al. | 260—563 |
| 3,097,138 | 7/1963 | Cavallini et al. | 167—65 |

OTHER REFERENCES

Reppe et al.: Ann. der Chem., vol. 560, pp. 25–30 (1948).

Schleyer et al.: "J. Am. Chem. Soc.," vol. 83, pp. 182–3 (1961).

Stetter et al.: Angew, Chem., vol. 71, pp. 429–430 (1959).

LEON ZITVER, *Primary Examiner.*

CHARLES B. PARKER, LORRAINE A. WEINBERGER, *Examiners.*

F. D. HIGEL, M. JACOB, *Assistant Examiners.*